United States Patent
Danilak

(10) Patent No.: US 7,568,056 B2
(45) Date of Patent: Jul. 28, 2009

(54) HOST BUS ADAPTER THAT INTERFACES WITH HOST COMPUTER BUS TO MULTIPLE TYPES OF STORAGE DEVICES

(75) Inventor: Radoslav Danilak, Santa Clara, CA (US)

(73) Assignee: NVIDIA Corporation, Santa Clara, CA (US)

( * ) Notice: Subject to any disclaimer, the term of this patent is extended or adjusted under 35 U.S.C. 154(b) by 417 days.

(21) Appl. No.: 11/092,170

(22) Filed: Mar. 28, 2005

(65) Prior Publication Data

US 2006/0248241 A1 Nov. 2, 2006

(51) Int. Cl.
*G06F 3/00* (2006.01)
*G06F 13/12* (2006.01)

(52) U.S. Cl. .......................................... 710/36; 710/63
(58) Field of Classification Search ................ 710/36, 710/63
See application file for complete search history.

(56) References Cited

U.S. PATENT DOCUMENTS

| | | | |
|---|---|---|---|
| 6,389,479 B1 * | 5/2002 | Boucher et al. | 709/243 |
| 2002/0062387 A1 * | 5/2002 | Yatziv | 709/236 |
| 2002/0069245 A1 | 6/2002 | Kim | |
| 2002/0091844 A1 | 7/2002 | Craft | |
| 2004/0019706 A1 * | 1/2004 | Smith | 710/1 |
| 2004/0233910 A1 * | 11/2004 | Chen et al. | 370/395.5 |

FOREIGN PATENT DOCUMENTS

EP 0 927 942 7/1999

OTHER PUBLICATIONS

Heidemann et al., 'Fire-System Development with Stackable Layers', Feb. 1994, Unieversity of California, pp. 58-89.*
Schmidt et al., 'Adaptive: a Dynamically Assembled Protocol Transformation, Integration, and eValuation Environment', Jun. 1993, University of California.*
Intel Corporation. "Serial ATA: Advanced Host Controller Interface (AHCI)," Revision 1.0, available at http://www.intel.com/technology/serialata/pdf/rev1_0.pdf, May 2004.
Woodside, et al. "The Protocol Bypass Concept for High Speed OSI Data Transfer", Protocols for High Speed Networks, Nov. 1, 1990. pp. 1-16.
European Search Report. Jun. 26, 2008.

* cited by examiner

*Primary Examiner*—Henry W. H. Tsai
*Assistant Examiner*—Hyun Nam
(74) *Attorney, Agent, or Firm*—Patterson & Sheridan, LLP

(57) ABSTRACT

One embodiment of the present invention provides a universal storage bus adaptor that can interface a host computer's bus to any of multiple types of storage devices. The universal serial bus adaptor provides transport layer functionality in such a way that a separate transport layer does not have to be provided for each type of storage device. Another embodiment of the present invention includes a file management system (or storage stack) that has a read/write chimney configured to enable a READ/WRITE operation to bypass the exception processing and management functionalities of the file management system. Bypassing these functionalities increases the processing efficiency of READ/WRITE operations.

14 Claims, 7 Drawing Sheets

HOST BUS ADAPTER THAT INTERFACES WITH HOST COMPUTER BUS TO MULTIPLE TYPES OF STORAGE DEVICES

FIELD OF THE INVENTION

This invention generally relates to computer data storage. More specifically, this invention relates to a universal storage bus adaptor that more efficiently executes data reads and writes.

BACKGROUND OF THE INVENTION

Computers and other systems have used disk drives for many years to store large amounts of digital information. This is because while computers and other systems may have sufficient main memory (such as random access memory) to perform ongoing computational tasks, when storing large amounts of data, such as an operating system, application programs, or program data, a mass storage device such as a disk drive is usually required.

There are many types of mass storage devices, including floppy disks, hard disks, optical disks (which includes DVD and CD devices), and non-volatile solid state memory devices (such as RAM disk). Those mass storage devices will be generically referred to as mass storage devices. Furthermore, many different technologies have been used to interface with mass storage devices. Today, in the personal computer environment there are two predominant general interface technologies: SCSI (small computer system interface) and IDE (Intelligent Drive Electronics, or Integrated Drive Electronics). Both technologies have numerous implementations within their general interface scheme. For example, SCSI-1, SCSI-2, Wide SCSI, Fast SCSI, Fast Wide SCSI, Ultra SCSI, SCSI-3, Ultra2 SCSI, Wide Ultra2 SCSI, EIDE, UDMA IDE, and Ultra-ATA IDE, and so on. Other competing systems include fiber channel, internet like fiber channel, external fiber channel, SAS, and so on.

IDE is a generic term that refers to a disk drive having a built-in controller. A built-in controller is a major advantage because a mass storage device manufacturer does not have to make their devices compatible with any particular controller standard. All that is required is an IDE connector that interfaces a motherboard with the mass storage device.

Today, most interface technologies interface a mass storage device and a motherboard over a parallel bus, such as the PCI (Peripheral Component Interconnect) bus. However, other types of drives can connect through a parallel port or other port, such as the ISA (Industry Standard Architecture) bus.

Each type of storage device requires a driver to interface with a host controller of a host computer system. Each driver has a transport layer that allows that driver to communicate with its respective storage device. At some layer of abstraction, all personal computers operate using a Small Computer System Interface SCSI-type format. The host controller and the storage device driver translate the SCSI-type format commands to that used by the storage device. Serial attached SCSI, a new format, includes an optional extension that supports Serial Advanced Technology Attachment (SATA). This allows mixing and matching of serial attached SCSI and SATA storage devices. All other protocols are essentially a SCSI protocol encapsulated with some type of transport layer. So, if the transport layer is removed, all devices talk SCSI. However, as described above, the transport layer is required to communicate with the storage device.

No matter the type of memory or the interface technology, data storage or data recover is initiated by a processor that causes a host controller to interface the processor to a mass storage device. Data flows to and from the mass storage device through the host controller. In personal computers, the parallel data storage ATA (AT Attachment) specification has defined the standard storage interface for PCs since the 1980s. ATA stands for Advanced Technology Attachment, which refers to a disk drive that has an integrated controller on the disk drive itself. Parallel ATA is low cost, widely supported, well known and well accepted, and has proven capable of high speed performance. There are several versions of ATA. By itself ATA is used interchangeably with IDE, ATA-2 (EIDE/ Fast ATA) supports faster operating modes and multiword DMA modes, supports logical block addressing (LBA) and block transfers; ATA-3, Ultra-ATA (Ultra-DMA, ATA-33, and DMA-33) supports multiword DMA mode 3 running at 33 MBps, ATA/66 doubles ATA's throughput, and ATA/100.

While parallel ATA has proven beneficial, it has limitations. It requires many pins and parallel conductors, uses 5 volt technology, and is difficult to implement in a manner that supports the high data rates required for multimedia applications. Because of those shortcomings, Serial ATA, also known as SATA, a high-performance interface for storage devices, has been developed. Not to be outdone, a serial interface specification for SCSI disk drives also has been developed.

The proliferation of storage device types and the increased storage dimensions of modern disk drives have created problems. Simply storing and retrieving data can consume a significant portion of a processor's time. This has created a need for host bus adapters (HBA) that interface a host computer's bus (usually PCI) to the bus or busses to the storage devices while minimizing the impact on a host processor's performance. This requires that the host bus adaptor handle many low-level interface functions, either automatically or with minor host processor or storage device processor involvement. For example, Intel has developed an Advanced Host Controller Interface (AHCI) specification that describes at the register level how a SATA device interfaces with a host controller's hardware. A serial SCSI device can have a completely different HBA.

Since a bus to a storage device can be one of several standardized busses, or can even be a custom bus, the host bus adaptor must be matched to the storage device that is used. All computer storage device bus ports essentially operate on a SCSI-like command level. In the prior art, a storage device's command protocol was implemented using a software driver that interfaced commands from a dedicated host controller to the storage device. The software driver required the interaction of the host processor. The host controller and the software driver effectively translated the SCSI-type format to the storage device's protocol. With large memory devices in applications that made many file system interactions the host processor spent an inordinate amount of time implementing the software driver. This can be extremely difficult or expensive to do since available storage devices may not be known at the time the HBA is added to a system, can change over time, or can be customized to fit particular applications.

FIG. 1 is a conceptual diagram illustrating how a prior art file management system 100 (or storage stack) interacts with storage device hardware 114. File management system 100 implemented both a volume manager 104 that directed file system 102 requests to a particular storage volume and a partition manager 106 that directed file system 102 requests to a particular partition within that storage volume. These can be considered as identifying available storage devices of the host computer system. File management system 100 also implemented a class (such as SCSI or IDE) driver 108 to support storage classes and a port driver 110 to enable port I/O operations. A bus driver 112 was implemented as required to pass signals on the required busses without bus conflicts, and finally storage device hardware 114 would be connected to a storage bus of the storage device being accessed. The class driver 108, port driver 110 and bus driver 112, together, act as the transport layer for the driver associated with the storage device being accessed. If desired, the file management system 100 could also implement data compression and encryption 103. Two drawbacks of the architecture generally illustrated here are that (i) it requires a separate transport layer for each type of storage device used in the host computer system and (ii) upwards of 90% of transactions between the file system 102 (i.e. the operating system) and the various storage devices of the host computer system are READ/WRITE operations—such operations do not typically require the services of layers 103, 106, 108, 110 and 112 of the file management system 100. Processing each transaction through needed intermediate layers is insufficient and time consuming. Therefore, a new type of device that can interface a host computer's bus to multiple storage devices would be beneficial. Even more beneficial would be a universal storage bus adaptor that can interface a host computer's bus to any of multiple storage devices.

SUMMARY OF THE INVENTION

Embodiments of the principles of the present invention provide for a universal storage bus adaptor that can interface a host computer's bus to any of multiple types of storage devices. The universal serial bus adaptor provides transport layer functionality in such a way that a separate transport layer does not have to be provided for each type of storage device.

Embodiments of the present invention include a file management system (or storage stack) that includes a read/write chimney configured to enable a READ/WRITE operation to bypass the exception processing and management functionalities of the file management system. Bypassing these functionalities increases the processing efficiency of READ/WRITE operations. Further, the architecture provides other types of operations access to the services of the exception processing and management layers of the file management system when necessary for processing.

BRIEF DESCRIPTION OF THE DRAWINGS

The principles of the present invention can be readily understood by considering the following detailed description in conjunction with the accompanying drawings, in which.

DETAILED DESCRIPTION OF THE PREFERRED EMBODIMENTS

The principles of the present invention provide for a universal storage bus adaptor that directly interfaces read/write data requests between a host computer's bus and different types of storage devices. Such a universal storage bus adaptor mates a host computer's main bus (PCI) to a memory device bus in such a manner that data can be written to and read from the memory device bus using standardized read/write commands and with little or no host processor interaction. Embodiments of the present invention can interface multiple types of storage devices using a storage stack having a read/write chimney that bypasses the exception processing and management functionalities of the storage stack.

Figure 2:
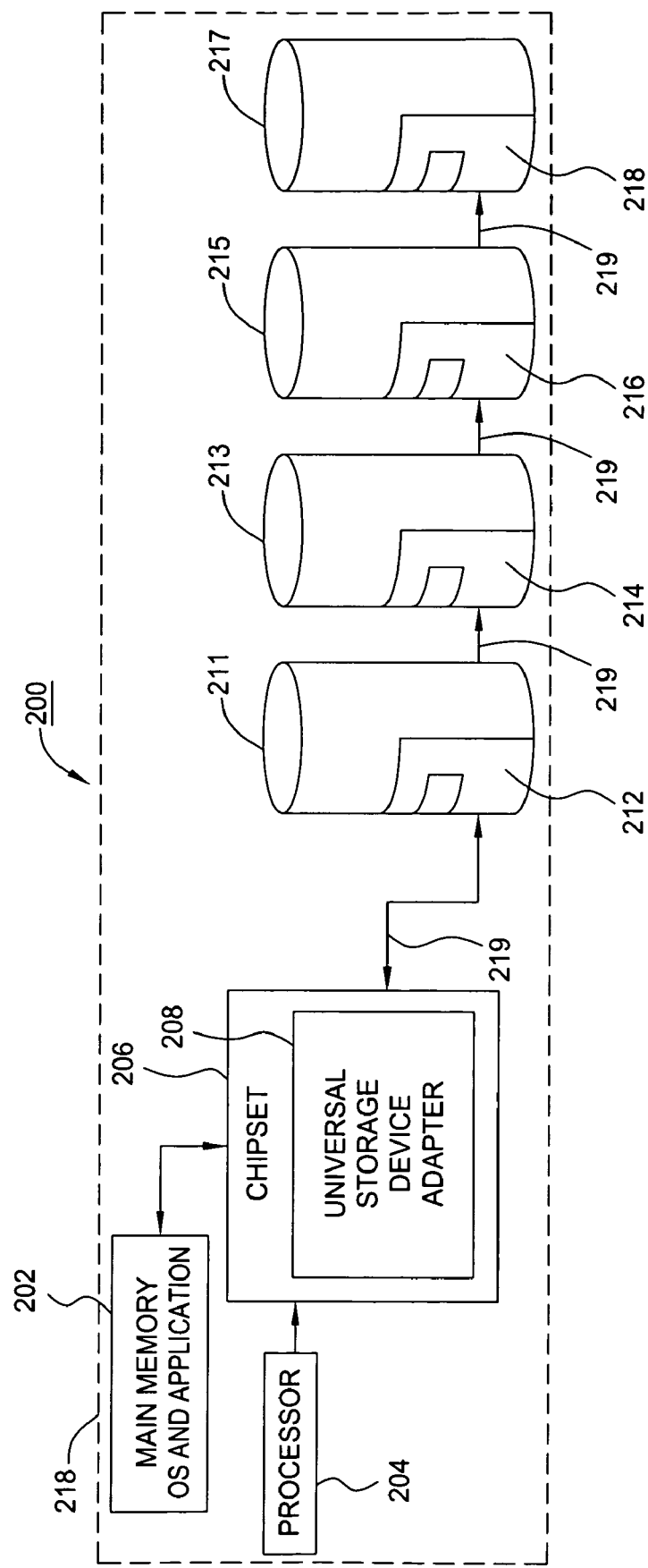
FIG. 2 illustrates a computer system configured to implement the present invention.

FIG. 2 illustrates a computer system 200 that is in accord with the principles of the present invention. The system 200 includes a main memory 202 for storing programs and data used by a processor 204. The system 200 further includes an auxiliary system that is generically shown as a chipset 206 that includes a universal storage bus adaptor 208. The universal storage bus adaptor 208 beneficially includes hardware compression/decompression engine support for RAID drives, and possibly other features. The universal storage bus adaptor 208 assists data integration with a disk drive system comprised of disk drives 211, 213, 215, and 217. The disk drives 211, 213, 215, and 217 can be, but need not be, part of a RAID storage system. Furthermore, the disk drives 211, 213, 215, and 217 can be of the same type (for example serial SCSI) or they can be of different types (for example serial SCSI and SATA drives). As described in further detail below in conjunction with FIGS. 3 and 4, the universal storage bus adaptor 208 is designed and implemented to work with multiple types of storage devices.

The disk drives 211, 213, 215, and 217 include drive electronics 212, 214, 216, 218, respectively, that control data storing and reading within the individual disk drives. Data is passed between the universal storage bus adaptor 208 and the disk drives 211, 213, 215, and 217 via a bidirectional storage bus 219. The universal storage device adaptor 208 interfaces the processor 204 via a main bus, typically a PCI bus, to the bidirectional storage bus 219. In practice, the bi-directional storage bus 219 is connected to one or more of the disk drives 211, 213, 215, and 217 using an interface chip. To enable integration of the various components of the system 200, that system operates under the control of an operating system (not shown).

Figure 1:
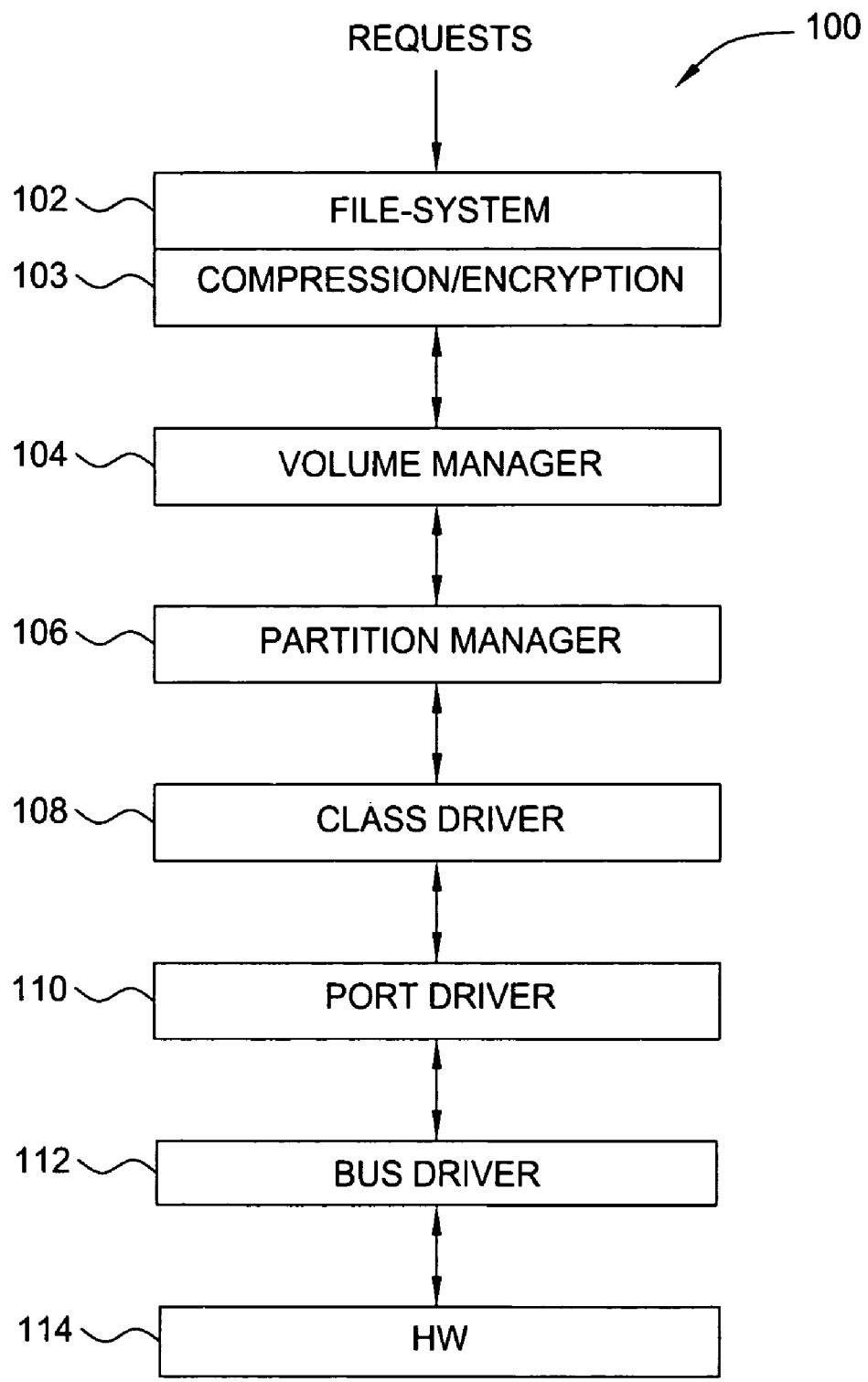
FIG. 1 illustrates a prior art bus storage adapter useful for integrating multiple disc drives with a computer system.
Figure 3:
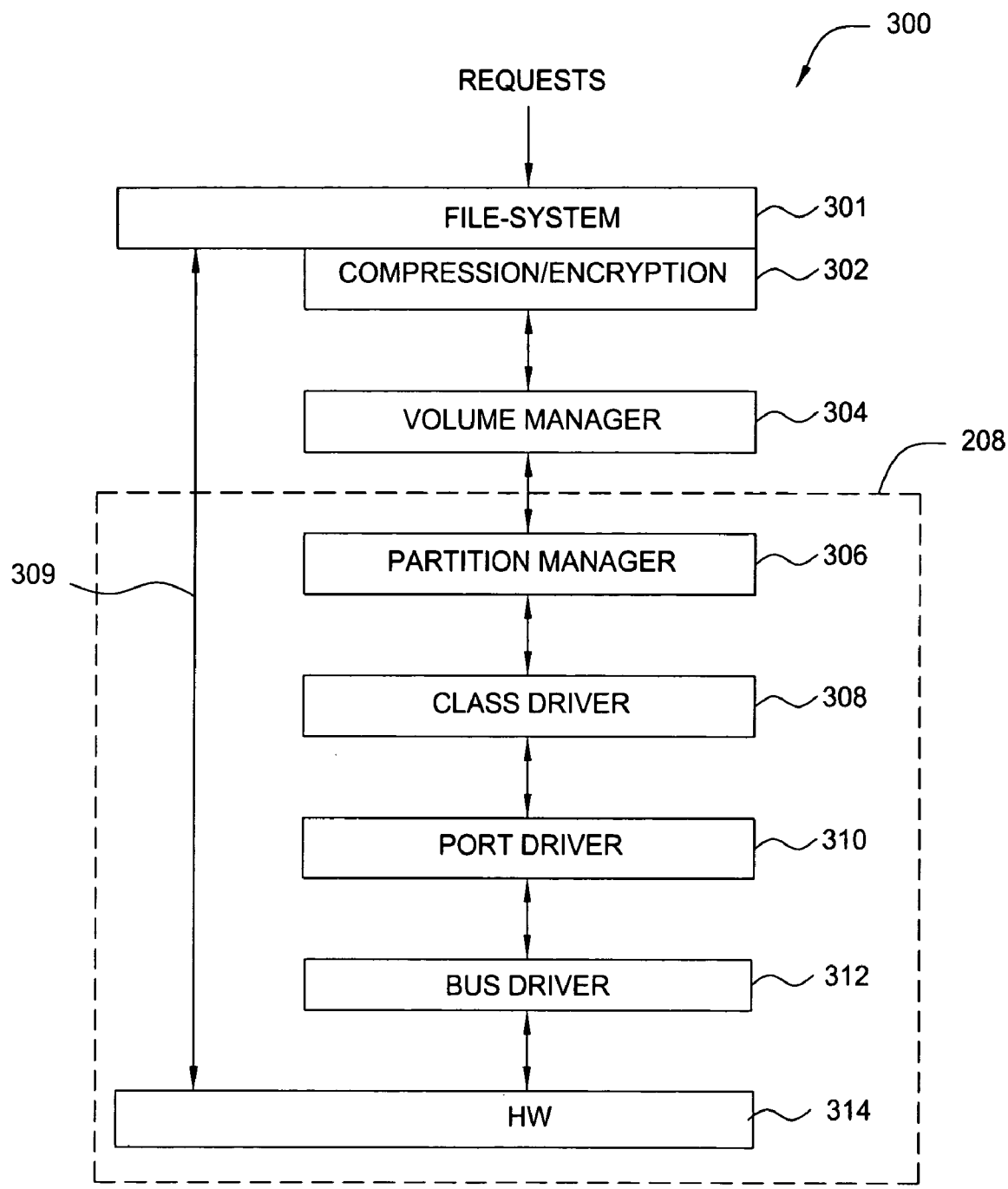
FIG. 3 illustrates a conceptual view a storage stack including a read/write chimney according to one embodiment of the present invention.

The computer system 200 implements a SCSI-based file management system 300 (or storage stack) that includes a read/write bypass to selectively pass READ/WRITE operations along with I/O data directly through the universal storage device adaptor 208 for processing. FIG. 3 illustrates the architecture of the file management system 300, according to one embodiment of the present invention. As shown, the file management system 300 includes the exception processing and management layers of the file management system 100 of FIG. 1. However, recognizing the predominance of READ/WRITE operations, the file management system 300 includes a read/write chimney 309 that pipelines READ/WRITE operations directly to and from storage device hardware layer 314. This architecture allows READ/WRITE operations to bypass compression/encryption layer 302, volume manager 304, partition manager 306, class driver 308, port driver 310 and bus driver 312. Bypassing these exception processing and management layers is highly advantageous when multi-gigabyte storage devices are used since simply managing READ/WRITE operations can consume significant portions of a processor's time. Notwithstanding the foregoing, operations other than READ/WRITE operations may be processed using the services of the exception processing and management layers in accordance with principles of conventional file management system 100 of FIG. 1.

As also shown, the class driver 308, the port drive 310 and the bus driver 312, which together form the transport layer, are included within the universal storage device adaptor 208. As described in further detail below in conjunction with FIG. 4, moving the functionalities of the transport layer into the universal storage device adaptor 308 enables one SCSI-based transport layer to be used with any type of storage device, regardless of whether that storage device is SCSI-based, SATA-based or otherwise. Such an architecture avoids having to create a separate transport layer for each type of storage device, which is significant advancement over prior art systems.

Figure 4:
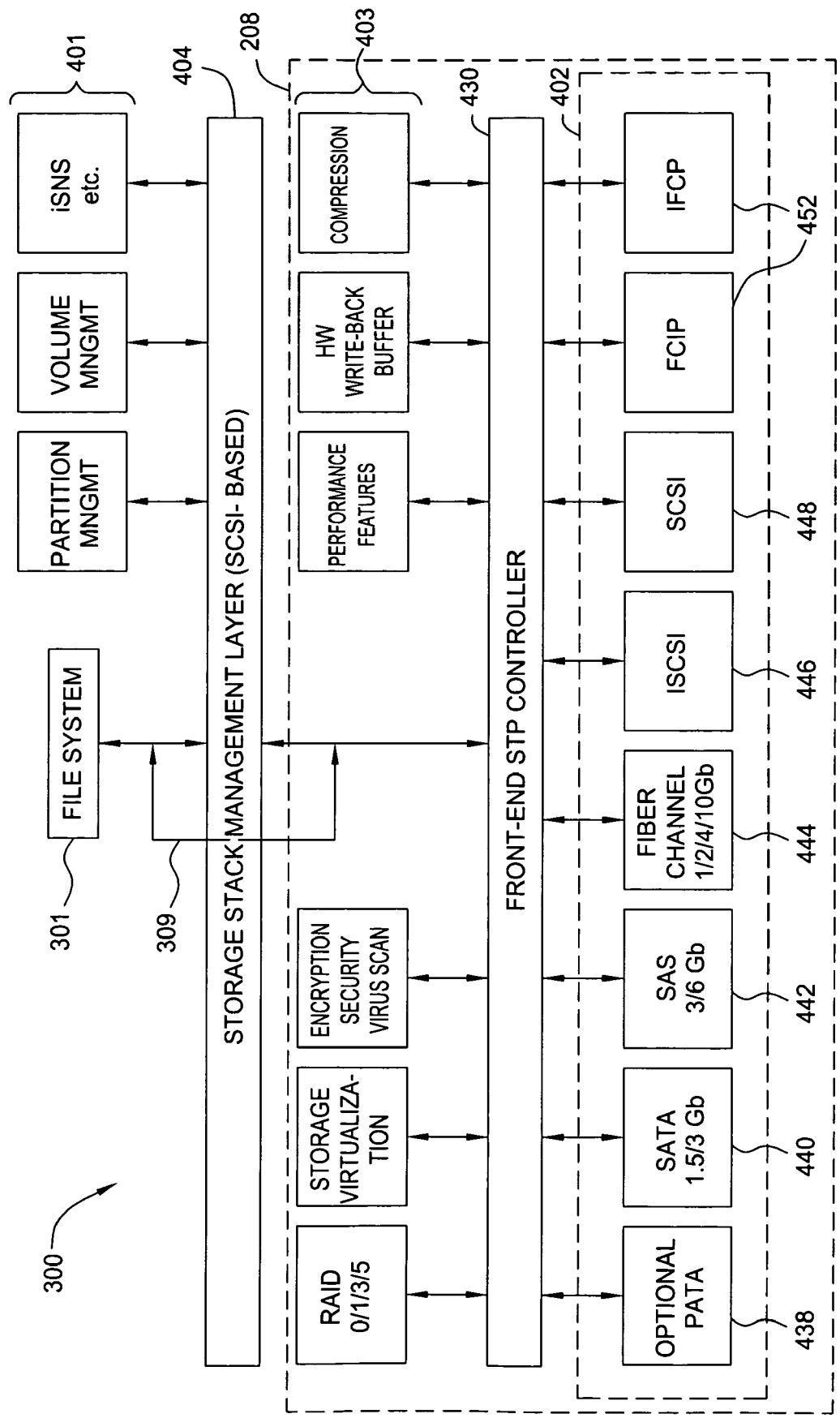
FIG. 4 is a functional block diagram of the universal storage bus adapter of FIG. 3 according to one embodiment of the invention.

FIG. 4 illustrates an implementation architecture for the file management system 300 and the universal storage device adaptor 208, according to one embodiment of the present invention. A storage stack management layer 404 is configured to provide operations transmitted by the file system 301 access to the various services of modules 401. Among other things, the modules 401 include the management functionalities of the compression/encryption layer 302, the volume manager 304 and the partition manager 306 of FIG. 3. The disclosed architecture is designed such that modules 401 may be added or removed, depending on the functionalities required by the file management system 300. In one embodiment, the modules 401 and the storage stack management layer 404 are implemented in software.

A controller 430 is coupled to modules 403 and an interface layer 402. In one embodiment, the modules 403 are the hardware complements of the modules 401. Thus, to the extent functionality is added or removed from the file management system 300, a software module 401 is added or removed, as the case may be, and a corresponding hardware module 403 is added or removed, as the case may be. Since modules 403 are complements of modules 401, modules 403, among other things, include the management functionalities of the compression/encryption layer 302, the volume manager 304 and the partition manager 306 as well.

The controller 430 includes the transport layer functionalities of the class driver 308, the port driver 310 and the bus driver 312 of FIG. 3. Further, in one embodiment, the controller 430 and the interface layer 402 include the functionalities of the storage device hardware layer 314 of FIG. 3.

The interface layer 402 includes various interface modules (e.g., interface modules 438, 440, 442, 444, 446, 448 and 452) that are coupled to corresponding storage devices (not shown). Each interface module is configured for a specific storage device protocol and translates the SCSI-based commands transmitted from file system 301 into that storage device protocol, and vice versa. For example, the interface 440 is configured to translate SCSI-based commands into SATA and SATA-based commands into SCSI. In one embodiment, the functionality of the interface layer 402 is implemented in hardware. The interface layer 402 enables the host controller to benefit from the fact that the SAS physical layer 442 is backwardly compatible with the SATA physical layer 440 and thus allows either SAS or SATA disk drives to be directly connected to the universal storage bus controller 430.

Importantly, to the extent that a storage device is added to the computer system 200, an interface module corresponding to the protocol used by that storage device may be added to interface layer 402 such that file management system 300 may communicate properly with that storage device. Since the transport layer functionality is included in the controller 430, no additional transport layer functionality needs to be added to file management system 300 to support the added storage device. In this fashion, the universal storage bus adaptor 208, which, in one embodiment, includes the modules 403, the controller 430 and the interface layer 402, is configured to be adapted to any type of storage device used with the computer system 200.

As also shown, the architecture enables the controller 430 to accept SCSI-type READ/WRITE operations directly from the file system 301 through the read/write chimney 309. As described in further detail below in conjunction with FIG. 5, the controller 430 is configured to process these operations, distributing them to the appropriate storage devices connected to interface layer 402. With reference to FIG. 2, the data associated with the READ/WRITE operations are transferred between the main memory 202 and one or more of the disk drives 211, 213, 215, and 217. As previously described, each of these storage devices is coupled to one of the interface modules of interface layer 402 based on the protocol used by the particular storage device.

In accord with the principles of the present invention, much of the burden of implementing READ/WRITE operations is shifted to hardware. This has the dual advantages of reducing READ/WRITE latencies, since hardware is much faster than software, and making the host processor more available to handle other tasks. While READ/WRITE operations are only two of the numerous file management operations that exist, shifting much of the burden of implementing READ/WRITE operations to hardware is particularly beneficial since READ/WRITE operations comprise the vast majority of file systems operations that actually occur.

Figure 5A:
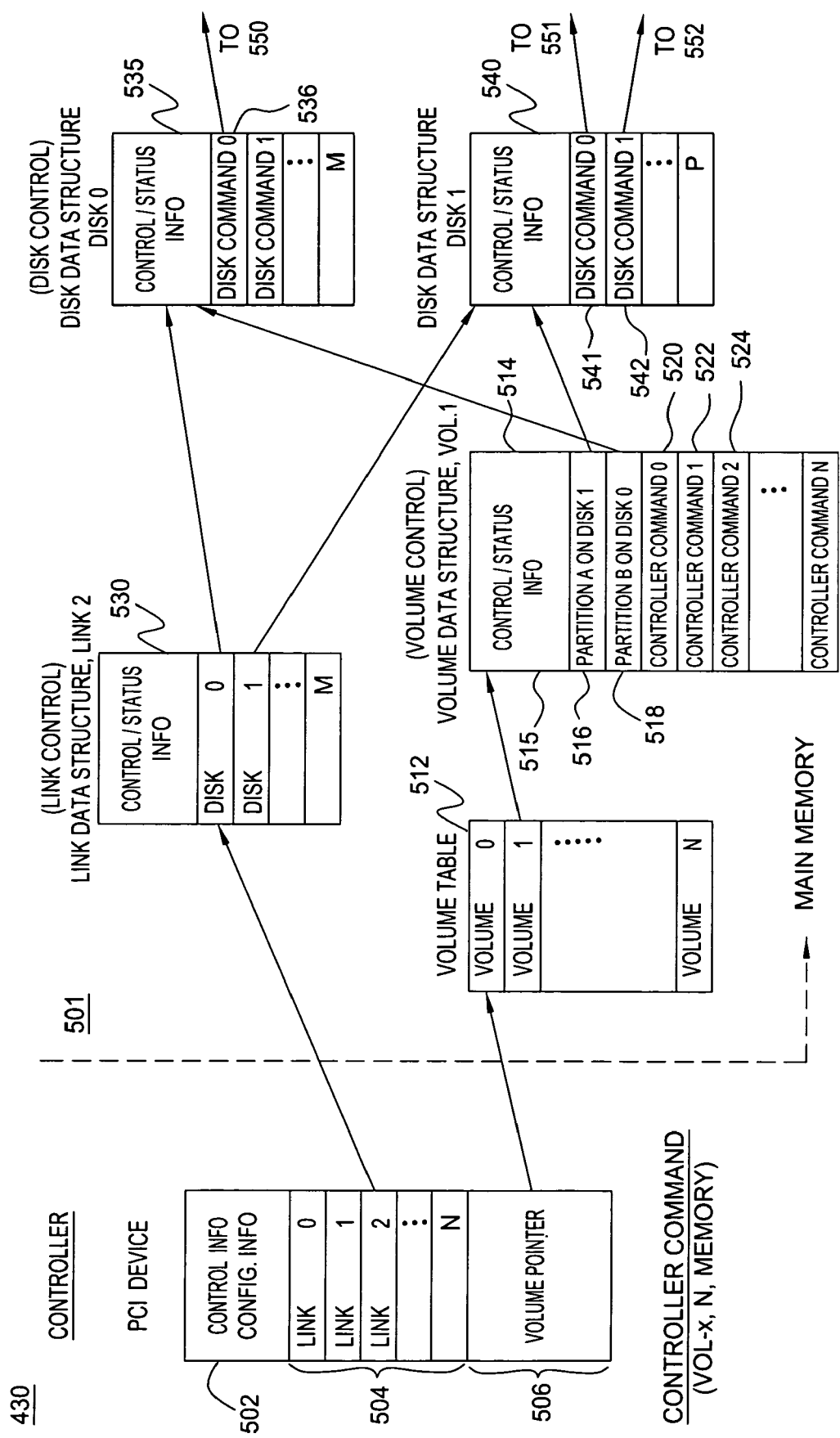
FIGS. 5A and 5B are a conceptual diagram of the sequence of events needed to access data in the storage devices initializing the storage stack and chimney of FIG. 3.
Figure 5B:
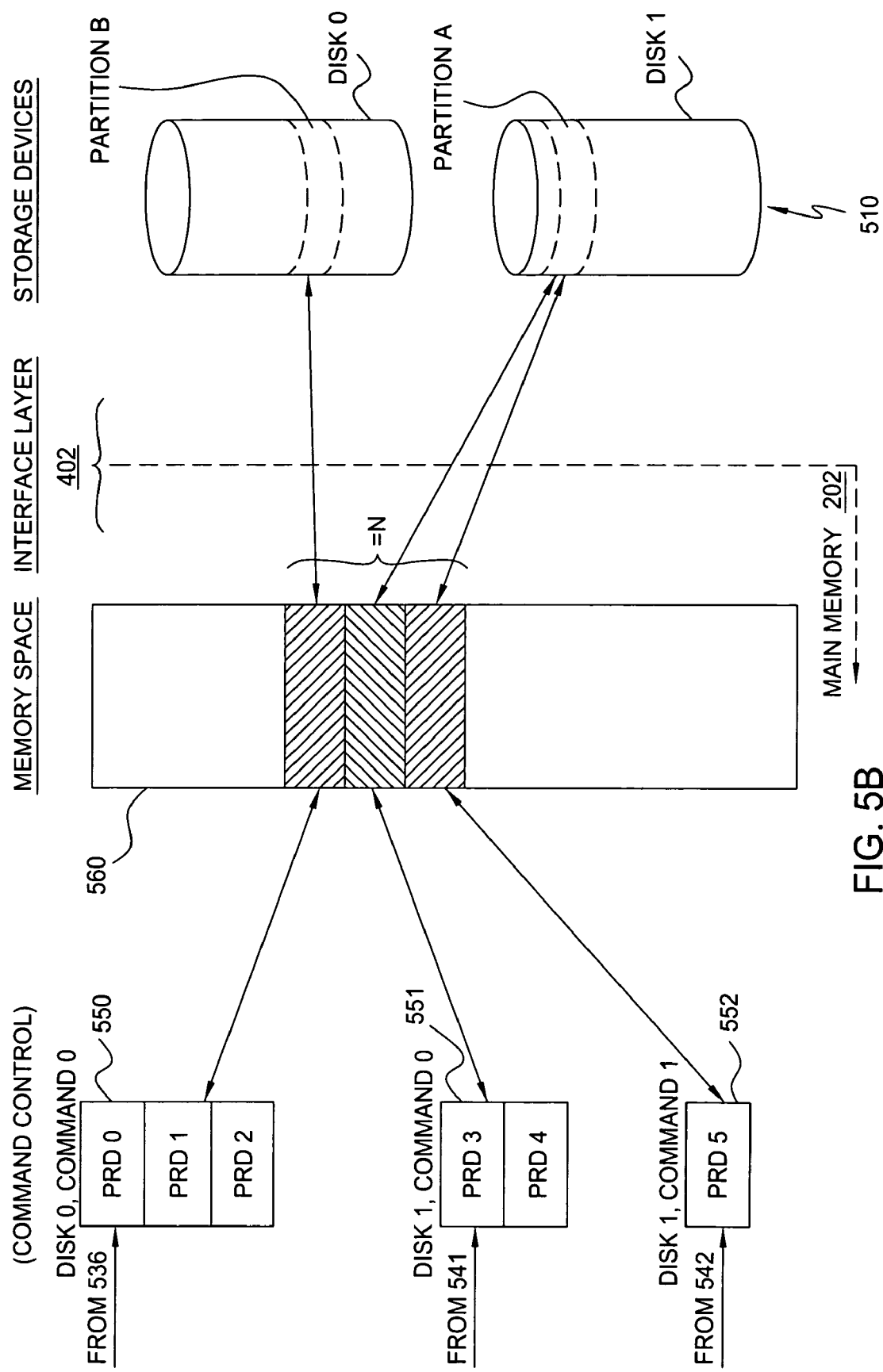

Referring to FIGS. 5A and 5B, according to the present invention, the controller 430 is configured to execute read/write commands (also referred to as controller commands) taken from the main memory 202 of FIG. 2. The controller 500 executes these commands, which are in the format of (volume X, number of bytes to be transferred, and memory location).

The controller 430 stores the information taken from each of these commands. It can be seen that the controller command provides the volume, which is a set of partitions to or from which data is to be transferred, the number of bytes to be transferred, and the memory location information that specifies where in main memory 202 the data is to be transferred to or from. More specifically, the memory location information includes a set of physical region descriptions (PRDs) that describe areas in memory space 560 where the data is to be transferred to or from. Controller 430 is configured to write data to or read data from the storage devices 211, 213, 215, 217 of FIG. 2 (represented by storage devices 510). These storage devices are typically in a raid array comprising multiple disk drives wherein a volume is identified in partitions found on a plurality of the disks.

The controller 430 comprises a plurality of registers, which are defined as a part of the PCI or other standardized interface specification. These registers store control information and configuration information in a region 502, link pointers in a region 504, and a volume pointer in a region 506. Through these registers the said read/write commands are executed. The link pointers and volume pointers will be used in a manner to be described below to execute the controller command.

As previously described, a controller command, such as controller command 520, contains the volume to or from which the data is to be transferred. The controller command 520 is written to the volume data structure 514, as indexed by both the volume pointer register in region 506 and the volume table 512, corresponding to the volume specified in the controller command. Subsequent controller commands 522 and 524 for this volume may be appended to volume data structure 514 as shown. The volume data structure 514 also contains control and status information 515 and information associating disk partitions 516, 518 within said disk volume. This information is used to determine the precise disks and partitions relevant to the volume specified in the controller command 520.

The universal storage adaptor 208 controls multiple disk storage drives. The disk storage drives are distributed on a plurality of physical links. Each physical link may support several disk storage drives. For each physical link, there is a link pointer 504 in controller 430 that points to a link data structure 530 associated with the particular physical link. The link data structure 530 contains a sequence of links that provide the control signals to access the disks associated with the said link. The combination of the link data structure 530 and volume data structure 514 provides a sequence of disk data structures 535, 540.

Every disk partition 516, 518 in the volume data structure 514 points to a disk data structure 535, 540. As described in further detail below in conjunction with step 602 of FIG. 6, a controller command 520 is converted into one or more disk commands that are used to transfer data to or from the specific storage devices 510. The disk commands are sequenced in the appropriate disk data structures, meaning that disk commands for transferring data to or from a given storage device are sequenced in the disk data structure corresponding to that storage device. For example, disk command 536 transfers data to or from Disk 0 and therefore resides in disk data structure 535, and disk commands 541, 542 transfer data to or from Disk 1 and therefore reside in disk data structure 540. The disk commands are derived from the volume data structure 514 and the link data structure 530. Furthermore, each individual disk command contains one or more PRDs that describe the areas in memory space 560 to or from which data is transferred using that disk command. The PRDs for the different disk commands correspond to the PRDs included in the memory location information of the controller command 520.

In this exemplary discussion, the components of disk command 536 are shown as three PRDs in the detailed view of the disk command 550. In a similar manner, disk command 541 contains two PRDs in the detailed view of the disk command 551 and disk command 542 contains one PRD in the detailed view of the disk command 552. The disk commands 550, 551, 552 are a sequence of one or more PRDs that access information in the memory space 560 where the data from the disk storage devices 510 is stored or retrieved. The link data structure 530 provides the interface to hardware, while the volume data structure 514 identifies the partitions on disks storage devices 510 where the data comprising the entire volume is stored. In this way, any command that needs to be carried out can be defined by the software and then executed in the hardware components, which are associated with the universal storage bus adaptor 208.

In addition to the foregoing, the volume data structure 514 tracks the execution of a particular controller command by counting the number of disk commands that are associated with the corresponding controller command and creating a disk command count equal to that number. As each disk command 536, 541, 542 is executed, the disk data structures 535, 540 communicate back to the volume data structure 514, via the control/status information region 515, the completion of each disk command. The volume data structure 514 decrements the disk command count each time a disk command is completed. When the disk command count reaches zero, the volume data structure 514 provides an interrupt for the file system 301 through control/status information region 515 signaling that the controller command has been completely executed.

Figure 6:
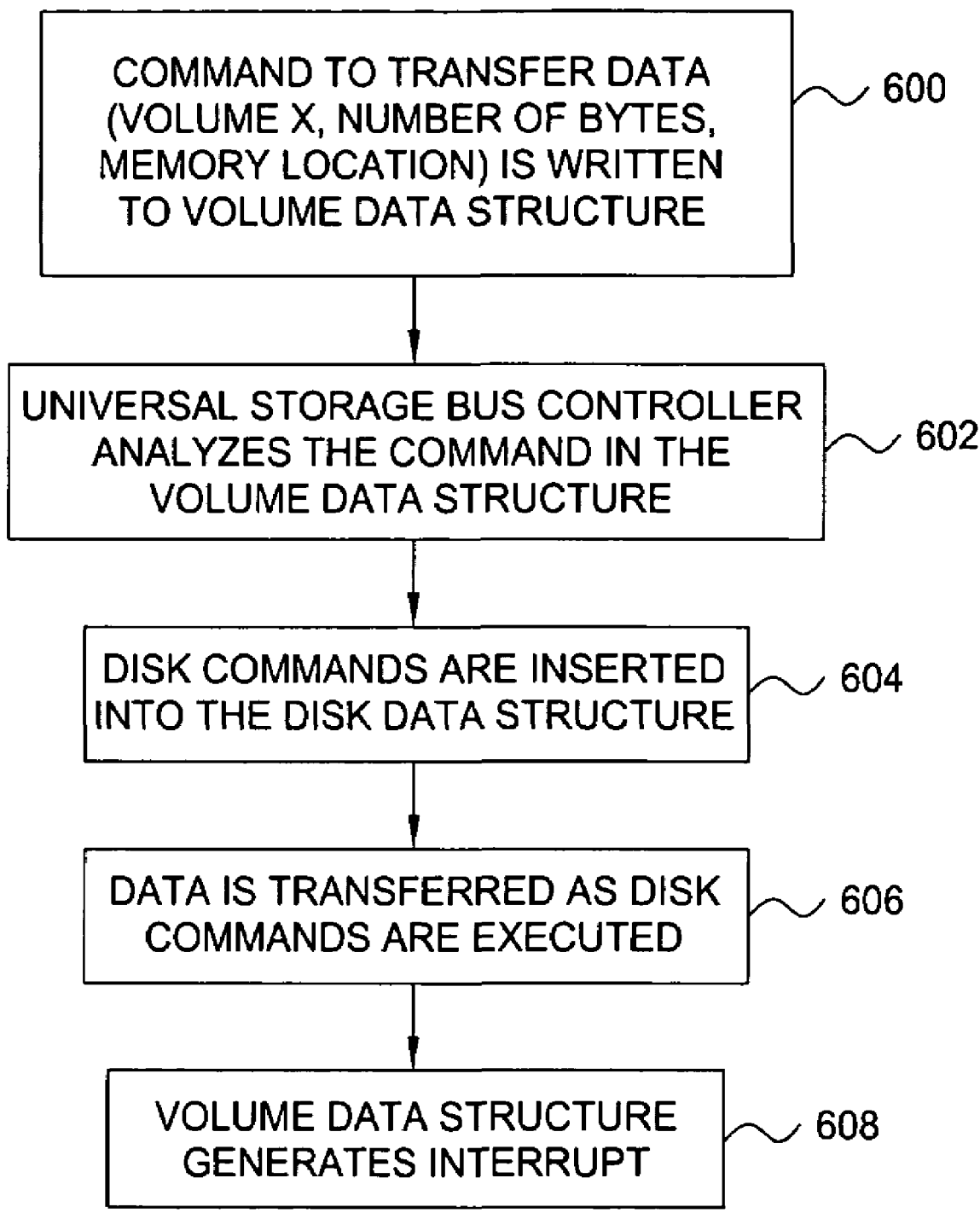
FIG. 6 is a flow chart of the sequence of events used to transfer data as illustrated in FIGS. 5A and 5B.

FIG. 6 is a flow chart illustrating the sequence of steps in the operation of the present invention responding to READ/WRITE operations transmitted by file system 301. The typical command comprises (volume X, number of bytes to be transferred, and memory location) where X is the volume to be accessed, and the memory location is location in main memory space where the accessed data is to be read from or written to.

In step 600 the controller command 520 is written into the volume data structure 514. The volume data structure 514 is determined by the volume pointer 506 which uses the controller command 520 to index into the volume table 512, which points to the correct volume data structure 514. The controller command 520 can be either a READ or WRITE command. In step 602, the universal storage bus controller analyzes the controller command 520 in the volume data structure 514. The volume data structure 514 and the link data structure 530 together contain the necessary information required to create the individual disk commands 536, 541 and 542 required to support the controller command 520 such as disk/partition relationship, offset of the partition for the beginning of the disk, size of the partition and other volume information. In step 604, the disk commands 536, 541 and 542 are written into the disk data structures 535 and 540. Each disk command contains one or more PRDs that describe areas of main memory into which the data will be written to or read from. The disk data structures 535 and 540 are comprised of a plurality of disk commands. In step 606, data is transferred to/from the disk drive storage devices from/to memory space as each disk command 536, 541 and 542 from the disk data structure is executed. The disk data structures 535 and 540 indicate to the volume data structure 514 the completion of each disk command. When all disk commands for the controller command 520 in the volume data structure have completed, in step 608 an interrupt is generated to the operating system.

Although the invention has been described above with reference to specific embodiments, persons skilled in the art will understand that various modifications and changes may be made thereto without departing from the broader spirit and scope of the invention as set forth in the appended claims. The foregoing description and drawings are, accordingly, to be regarded in an illustrative rather than a restrictive sense.

What is claimed is:

1. A file management system, comprising:
 a storage stack management layer configured to provide services implemented in software;
 a file system; and
 a storage device adaptor, including:
  a hardware interface layer, and
  a controller having a transport layer coupled to the hardware interface layer,
  wherein the controller is configured to transmit Small Computer System Interface based (SCSI-based) read/write commands directly from the file system to the hardware interface layer and from the hardware interface layer directly to the file system via a read/write chimney that bypasses the transport layer,
  wherein the transport layer comprises at least one of a class driver, port driver, and bus driver, wherein the hardware interface layer includes a plurality of interface modules, and each interface module is configured to communicate with a specific storage device type by translating the SCSI-based read/write commands transmitted from the file system into commands of a particular storage device protocol corresponding to the storage device type, wherein no additional transport layer functionality is provided within each of the plurality of interface modules, and wherein the controller is coupled to services modules that are hardware complements of the services provided by the storage stack management layer.

2. The file management system as in claim 1, wherein the services provided by the storage stack management layer include at least one of compression/encryption, volume management, and partition management.

3. The file management system as in claim 1, wherein the hardware interface layer and the plurality of interface modules are implemented in hardware, and further comprising a storage stack management layer, wherein the services of the storage stack management layer are implemented in software.

4. The file management system as in claim 1, wherein a first interface module is configured to translate the SCSI-based read/write commands transmitted from the file system into Serial Advanced Technology Attachment (SATA) commands associated with a SATA storage device protocol, and a second interface module is configured to translate the SCSI-based read/write commands into Internet Fiber Channel Protocol (IFCP) commands associated with a IFCP storage device protocol.

5. The file management system as in claim 1, wherein an additional interface module is added to the file management system configured to translate the SCSI-based read/write commands into a protocol associated with an additional storage device type, and no additional transport layer functionality is added to the file management system via the additional interface module or any modifications to the controller.

6. The file management system as in claim 1 wherein the controller is configured to execute the SCSI-based read/write commands to transfer data through the hardware interface layer to a main memory wherein the commands comprise a command identifying a volume to be transferred, a number of bytes to be transferred and a location in main memory where the data is to be transferred.

7. The file management system as in claim 6 wherein the volume comprises a plurality of partitions, wherein the partitions are stored on one or more of a plurality of storage devices.

8. The file management system as in claim 7 wherein the controller comprises a plurality of registers that store a pointer to a volume table that includes at least one volume that may be stored on the storage devices, and pointers to disk data structures that store portions of the at least one volume.

9. The file management system as in claim 8 wherein the controller responds to the volume data structures and disk data structures to establish a sequence of disk commands stored in the disk data structure and physical region descriptions pointing to regions in main memory where the data is transferred.

10. A computing device, comprising:
a memory for storing programs and an operating system;
a processor configured to execute the operating system;
a plurality of disk drives; and
a chipset that includes:
a storage device adaptor configured to read and write data to and from the plurality of disk drives and the memory, and
a storage stack management layer configured to provide services implemented in software,
wherein the storage device adaptor transmits Small Computer System Interface based (SCSI-based) read/write commands directly from memory to a hardware interface layer of the storage device adaptor and from the hardware interface layer directly to the memory via a read/write chimney that bypasses a transport layer of the storage device adaptor,
wherein the transport layer comprises at least one of a class driver, port driver, and bus driver,
wherein the hardware interface layer includes a plurality of interface modules, and each interface module is configured to communicate with a specific storage device type by translating the SCSI-based read/write commands transmitted from the memory into commands of a particular storage device protocol corresponding to the storage device type,
wherein no additional transport layer functionality is provided within each of the plurality of interface modules, and
wherein the controller is coupled to services modules that are hardware complements of the services provided by the storage stack management layer.

11. The computing device according to claim 10, wherein the services provided by the storage stack management layer include at least one of compression/encryption, volume management, and partition management.

12. The computing device according to claim 10, wherein the hardware interface layer and the plurality of interface modules are implemented in hardware, and further comprising a storage stack management layer, wherein the services of the storage stack management layer are implemented in software.

13. The computing device as in claim 10, wherein a first interface module is configured to translate the SCSI-based read/write commands transmitted from the memory into Serial Advanced Technology Attachment (SATA) commands associated with a SATA storage device protocol, and a second interface module is configured to translate the SCSI-based read/write commands into Internet Fiber Channel Protocol (IFCP) commands associated with a IFCP storage device protocol.

14. The computing device as in claim 10, wherein an additional interface module is added to the file management system configured to translate the SCSI-based read/write commands into a protocol associated with an additional storage device type, and no additional transport layer functionality is added to the file management system via the additional interface module or any modifications to the controller.

* * * * *